United States Patent
Yin et al.

(10) Patent No.: US 11,108,734 B2
(45) Date of Patent: Aug. 31, 2021

(54) ERROR INDICATION PROCESSING AND SYSTEM, AND DEVICE

(71) Applicant: HUAWEI TECHNOLOGIES CO., LTD., Guangdong (CN)

(72) Inventors: Yu Yin, Shanghai (CN); Caixia Qi, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 70 days.

(21) Appl. No.: 16/426,109

(22) Filed: May 30, 2019

(65) Prior Publication Data

US 2019/0281015 A1 Sep. 12, 2019

Related U.S. Application Data

(63) Continuation of application No. PCT/CN2016/108095, filed on Nov. 30, 2016.

(51) Int. Cl.
*H04L 29/12* (2006.01)
*H04L 12/26* (2006.01)
*H04L 29/06* (2006.01)
*H04W 76/22* (2018.01)
*H04W 80/04* (2009.01)

(52) U.S. Cl.
CPC .......... *H04L 61/2592* (2013.01); *H04L 29/06* (2013.01); *H04L 43/0823* (2013.01); *H04W 76/22* (2018.02); *H04W 80/04* (2013.01)

(58) Field of Classification Search
CPC . H04L 61/2592; H04L 29/06; H04L 43/0823; H04L 69/40; H04W 76/22; H04W 80/04
See application file for complete search history.

(56) References Cited

U.S. PATENT DOCUMENTS

| 2006/0023663 | A1 | 2/2006 | Kim et al. | |
|---|---|---|---|---|
| 2009/0147670 | A1* | 6/2009 | Hu | H04L 12/4633 370/216 |
| 2009/0305707 | A1* | 12/2009 | Pudney | H04W 40/34 455/445 |
| 2010/0202343 | A1* | 8/2010 | Hunzinger | H04B 7/15557 370/315 |

(Continued)

FOREIGN PATENT DOCUMENTS

| CN | 101197817 A | 6/2008 |
|---|---|---|
| CN | 101316152 A | 12/2008 |

(Continued)

OTHER PUBLICATIONS

PCT International Search Report and Written Opinion in International Application No. PCT/CN2016/108095, dated Aug. 31, 2017, 18 pages (With English translation).

(Continued)

*Primary Examiner* — Christine Ng
(74) *Attorney, Agent, or Firm* — Fish & Richardson P.C.

(57) ABSTRACT

The present disclosure provides an error indication processing method and system, and a device, and relates to the field of communications technologies, to resolve a problem that normal transmission of a service data packet is affected due to an inconsistency between contexts of an access node and a user plane network element in a next generation mobile communications network.

20 Claims, 9 Drawing Sheets

(56) References Cited

U.S. PATENT DOCUMENTS

2010/0322068 A1* 12/2010 Grahn .................. H04W 76/11
                                                                    370/217
2012/0082089 A1* 4/2012 Nelakonda .......... H04L 12/4633
                                                                    370/328

FOREIGN PATENT DOCUMENTS

| CN | 102036261 | A | 4/2011 |
| CN | 102164364 | A | 8/2011 |
| CN | 102457364 | A | 5/2012 |
| WO | 03039170 | A1 | 5/2003 |
| WO | 2008080717 | A1 | 7/2008 |
| WO | 2014184790 | A1 | 11/2014 |
| WO | 2016050673 | A1 | 4/2016 |

OTHER PUBLICATIONS

Office Action issued Chinese Application No. 201680091295.5 dated Mar. 11, 2020, 23 pages (with English translation).
Alcatel-Lucentet et al., "Addition of GTP based S2a," 3GPP Draft; 3GPP TSG CT WG4 Meeting #56, C4-120456, Feb. 6-10, 2012, XP050560348, 9 pages.
Extended European Search Report issued in European Application No. 16923107.3 dated Oct. 10, 2019, 9 pages.
Huawei, "One Solution to Error Indication for SGSN controlled bearer optimisation", 3GPP Draft; 3GPP TSG SA WG2 Architecture—S2#54, S2-062756, Aug. 28-Sep. 1, 2006, XP050256739, 6 pages.
3GPP TS 23.060 V14.1.0 (Sep. 2016), "3rd Generation Partnership Project; Technical Specification Group Services and System Aspects; General Packet Radio Service (GPRS); Service description; Stage 2(Release 14)," Sep. 2016, 366 pages.
Office Action issued in Chinese Application No. 201680091295.5 dated Nov. 23, 2020, 11 pages.

* cited by examiner

ERROR INDICATION PROCESSING AND SYSTEM, AND DEVICE

CROSS-REFERENCE TO RELATED APPLICATIONS

This application is a continuation of International Application No. PCT/CN2016/108095, filed on Nov. 30, 2016, which is hereby incorporated by reference in its entirety.

TECHNICAL FIELD

The present disclosure relates to the field of communications technologies, and in particular, to an error indication processing method and system, and a device.

BACKGROUND

The general packet radio service tunneling protocol (English: General Packet Radio Service Tunneling Protocol, GTP), briefly referred to as a tunneling protocol below, is a communication protocol between network elements that is widely applied to a general packet radio service (English: General Packet Radio Service, GPRS) network, and continues to be used in an evolved packet switched network (English: Evolved Packet Core, EPC) and a next generation mobile communications network.

The network elements to which the tunneling protocol is applied exchange a tunnel endpoint identifier (English: Tunnel Endpoint Identifier, TEID) with each other by using a signaling message. For example, a local network element assigns a TEID of the local network element to a peer network element, and the peer network element assigns a TEID of the peer network element to the local network element. When sending a service data packet to the local network element, the peer network element adds the TEID of the local network element to the service data packet, and sends the service data packet to the local network element. The local network element queries a context corresponding to the TEID of the local network element, and forwards the service data packet to a next network element based on information in the found context. However, due to a failure of communication between the network elements, failures of the network elements, or the like, the context corresponding to the TEID of the local network element is not successfully established on the local network element, or the context is lost. After receiving the service data packet that carries the TEID of the local network element, the local network element cannot find the context corresponding to the TEID. Consequently, the local network element cannot forward the service data packet to the next network element based on the information in the context, thereby seriously affecting normal transmission of the service data packet.

To resolve this problem, persons skilled in the art usually use the following processing method: The local network element sends an error indication message to the peer network element when the local network element receives the service data packet that carries the TEID of the local network element, but does not find the context corresponding to the TEID. The error indication message carries the TEID of the local network element and an Internet Protocol (English: Internet Protocol, IP) address of the local network element, a TEID field in a tunneling protocol header in the error indication message is an invalid field (for example, an all-0 field), and the IP address of the local network element is a destination IP address, at an IP protocol layer, of the service data packet. After receiving the error indication message, the peer network element queries a context that is stored in the peer network element and that corresponds to the TEID of the local network element and the IP address of the local network element, and uses a corresponding processing policy (for example, deleting the context or instructing the local network element to re-establish a context) to ensure a consistency between contexts of the local network element and the peer network element, thereby avoiding affecting normal transmission of the service data packet.

In a next generation mobile communications network shown in FIG. 1, an access node in an access network and a user plane network element may also communicate with each other by using the GTP protocol. However, a service data packet needs to be forwarded between the access node and the user plane network element by using a forwarding node. To be specific, the forwarding node stores a correspondence between a TEID of the user plane network element and the user plane network element, and the forwarding node determines, based on the TEID of the user plane network element that is carried in the received service data packet sent by the access node and the stored correspondence between the TEID of the user plane network element and the user plane network element, a specific user plane network element to which the service data packet is to be forwarded. In this case, if the access node does not find a context based on a TEID of the access node that is in the service data packet forwarded by the forwarding node, and therefore uses the foregoing processing method to forward an error indication message to the user plane network element by using the forwarding node, because a TEID field in a tunneling protocol header in the error indication message is an invalid field, the forwarding node cannot determine, based on the invalid TEID field, a specific user plane network element to which the error indication message is to be forwarded. Consequently, a consistency between contexts of the access node and the user plane network element cannot be ensured by using a corresponding processing policy, thereby affecting normal transmission of the service data packet.

SUMMARY

This application provides an error indication processing method and system, and a device, to resolve a problem that normal transmission of a service data packet is affected due to an inconsistency between contexts of an access node and a user plane network element in a next generation mobile communications network.

To achieve the foregoing objective, the following technical solutions are used in this application:

According to a first aspect, an embodiment of the present disclosure provides an error indication processing method, and the method may include: receiving, by a forwarding node, an error indication message that is sent by an access node and includes a tunnel endpoint identifier TEID of the access node and an IP address of the access node and in which a TEID in a tunneling protocol header is an invalid TEID; sending the error indication message to a first user plane network element based on the invalid TEID; and sending, by the first user plane network element, an error notification message to a control plane network element based on the error indication message.

The error notification message may carry the TEID of the access node and the IP address of the access node, or carry a context identifier corresponding to the TEID of the access node and the IP address of the access node, so that the control plane network element processes, according to a preset processing policy, a context corresponding to the TEID of the access node and the IP address of the access node, or processes, according to a preset processing policy, a context corresponding to the context identifier.

In this way, after the forwarding node receives the error indication message, the forwarding node may forward the error indication message to the user plane network element, so that the user plane network element sends the error notification message to the control plane network element based on the error indication message, to instruct the control plane network element to process a context in the access node or the user plane network element based on the error notification message, to implement a consistency between contexts of the user plane network element and the access node, thereby ensuring normal transmission of a service data packet.

With reference to the first aspect, in a possible implementation of the first aspect, the error indication message may be a message sent by the access node to the forwarding node after the access node receives a downlink service data packet that is sent by a second user plane network element and that includes the TEID of the access node and the IP address of the receiving node, but does not find a context corresponding to the TEID of the access node and the IP address of the access node in a context record stored in the access node.

The second user plane network element and the first user plane network element may be a same network element or different network elements. In other words, in this solution, a user plane network element that can receive the error indication message and that is selected by the forwarding node may be the original user plane network element that sends the downlink service data packet to the access node, or may be a new user plane network element. This is not limited in the present disclosure.

Optionally, in the present disclosure, the forwarding node may select, according to a preset algorithm, the first user plane network element from a network in which the forwarding node is located, for example, may randomly select, from a plurality of user plane network elements, a network element that receives the error indication message; or may fixedly select a user plane network element as the user plane network element that receives the error indication message; or may check a correspondence that is between a TEID of a user plane network element and the user plane network element and that is stored in the forwarding node, to determine a user plane network element in a first correspondence as the user plane network element that receives the error indication message.

It should be noted that in a possible implementation of the first aspect, before the forwarding node selects, by using the preset algorithm, the first user plane network element from the network in which the forwarding node is located, the forwarding node determines that a user plane network element needs to be selected, only after determining, based on the invalid TEID in the error indication message, that the access node does not find the context corresponding to the TEID of the access node and the IP address of the access node. The user plane network element sends the error notification message to a control plane, so that the control plane network element processes a context in the access node or the user plane network element.

In this way, after receiving the error indication message sent by the access node, the forwarding node may select, from the network, the user plane network element that can receive the error indication message, and forward the error indication message to the user plane network element. The user plane network element instructs the control plane network element to process a consistency between contexts of the access node and the user plane network element.

According to a second aspect, an embodiment of the present disclosure provides an error indication processing method, and the method may include:

receiving, by a first user plane network element, an error indication message that is sent by a forwarding node and includes a TEID of an access node and an IP address of the access node and in which a TEID in a tunneling protocol header is an invalid TEID; and sending, to a control plane network element based on the error indication message, an error notification message that carries the TEID of the access node and the IP address of the access node, or that carries a context identifier corresponding to the TEID of the access node and the IP address of the access node, so that the control plane network element processes, according to a preset processing policy, a context corresponding to the TEID of the access node and the IP address of the access node, or processes, according to a preset processing policy, a context corresponding to the context identifier.

In this way, after receiving the error indication message sent by the forwarding node, the user plane network element sends the error notification message to the control plane network element based on the error indication message, to instruct the control plane network element to process a context in the access node or the user plane network element based on the error notification message, to implement a consistency between contexts of the user plane network element and the access node, thereby ensuring normal transmission of a service data packet.

With reference to the second aspect, in a possible implementation of the second aspect, after receiving the error indication message, the user plane network element may directly use the error indication message as the error notification message and send the error notification message to the control plane network element; or when the user plane network element receives the error indication message, but does not find, based on information in the error indication message, a context corresponding to the TEID of the access node and the IP address of the access node, the user plane network element uses the error indication message as the error notification message and sends the error notification message to the control plane network element; or when the user plane network element receives the error indication message, and finds, based on information in the error indication message, a context corresponding to the TEID of the access node and the IP address of the access node, the user plane network element obtains a context identifier of the context, and adds the context identifier to the error notification message and sends the error notification message to the control plane network element.

In this way, the user plane network element may notify the control plane network element of related information that can be used to determine an inconsistency between contexts of the user plane network element and the access node, and the control plane network element processes a consistency between the contexts of the access node and the user plane network element.

According to a third aspect, the present disclosure provides an error indication processing method, and the method may include:

receiving, by a control plane network element, an error notification message that is sent by a first user plane network element and that carries a TEID of an access node and an IP address of the access node, or a context identifier; and processing, according to a preset processing policy, a context corresponding to the TEID of the access node and the IP address of the access node, or processing, according to a preset processing policy, a context corresponding to the context identifier.

In this way, after receiving the error notification message sent by the user plane network element, the control plane network element may process a context in the access node or the user plane network element based on the error notification message, to implement a consistency between contexts of the user plane network element and the access node, thereby ensuring normal transmission of a service data packet.

With reference to the third aspect, in a possible implementation of the third aspect, when the error notification message includes the tunnel endpoint identifier TEID of the access node and the Internet Protocol IP address of the access node, the processing, by the control plane network element according to a preset processing policy, a context corresponding to the TEID of the access node and the IP address of the access node may include:

querying, by the control plane network element based on the TEID of the access node and the IP address of the access node, a context corresponding to the TEID of the access node and the IP address of the access node, determining the access node and a second user plane network element, and re-establishing a context that is in the access node and that corresponds to the TEID of the access node and the IP address of the access node, or deleting a context that is in the second user plane network element and that corresponds to the TEID of the access node and the IP address of the access node.

With reference to the third aspect, in another possible implementation of the third aspect, when the error notification message includes the context identifier, the processing, by the control plane network element according to a preset processing policy, a context corresponding to the context identifier may include:

querying, by the control plane network element based on the context identifier, a context corresponding to the context identifier, determining the access node and a second user plane network element based on information included in the context, and re-establishing a context that is in the access node and that corresponds to the TEID of the access node and the IP address of the access node, or deleting a context that is in the second user plane network element and that corresponds to the TEID of the access node and the IP address of the access node.

In this way, a control plane may find, based on a status of the received error notification message, the context corresponding to the TEID of the access node and the IP address of the access node, and process the contexts in the user plane network element and the access node based on the information in the context, to ensure a consistency between the contexts of the user plane network element and the access node, thereby implementing normal transmission of a service data packet.

With reference to any one of the third aspect or the possible implementations of the third aspect, in still another possible implementation of the third aspect, the control plane network element may be divided into a user plane network element management function module, a session management function module, a mobility management function module, and the like.

A function performed by the control plane network element may be performed by the session management function module.

Alternatively, the session management module manages the context corresponding to the IP address of the access node and the TEID of the access node. The user plane network element management module records a correspondence between the context identifier and the session management module that manages the context. The user plane network element sends the error notification message to the user plane network element management module, and the user plane network element management module forwards the error notification message to a corresponding session management function module based on the context identifier in the error notification message and the correspondence stored in the user plane network element management module.

According to a fourth aspect, an embodiment of the present disclosure provides a forwarding node, and the forwarding node may include:

a receiving unit, configured to receive an error indication message that is sent by an access node and that includes a TEID of the access node and an IP address of the access node, where a TEID in a tunneling protocol header in the error indication message is an invalid TEID; and a sending unit, configured to send, to a first user plane network element based on the invalid TEID in the error indication message received by the receiving unit, the error indication message used to instruct the first user plane network element to send an error notification message to a control plane network element.

For specific implementations of the fourth aspect, refer to behavior functions of the forwarding node in the error indication processing method provided in the first aspect or the possible implementations of the first aspect. Details are not described herein again. Therefore, the forwarding node provided in the fourth aspect can achieve same beneficial effects as the first aspect.

According to a fifth aspect, an embodiment of the present disclosure provides a forwarding node, and the forwarding node may include:

a transceiver, configured to: receive an error indication message that is sent by an access node and that includes a TEID of the access node and an IP address of the access node, where a TEID in a tunneling protocol header in the error indication message is an invalid TEID; and send the error indication message to a first user plane network element based on the invalid TEID in the error indication message received by the transceiver, where the error indication message is used to instruct the first user plane network element to send an error notification message to a control plane network element.

For specific implementations of the fifth aspect, refer to behavior functions of the forwarding node in the error indication processing method provided in the first aspect or the possible implementations of the first aspect. Details are not described herein again. Therefore, the forwarding node provided in the fifth aspect can achieve same beneficial effects as the first aspect. In addition, the apparatus may further include a memory. The memory is configured to be coupled to a processor, and the memory stores a program instruction and data that are necessary for the apparatus.

According to a sixth aspect, an embodiment of the present disclosure provides a nonvolatile computer-readable storage medium that stores one or more programs, and the one or more programs include an instruction. When being executed by the forwarding node in any one of the fourth aspect or the possible implementations of the fourth aspect or in any one of the fifth aspect or the possible implementations of the fifth aspect, the instruction enables the forwarding node to perform the following events:

receiving an error indication message that is sent by an access node and that includes a TEID of the access node and an IP address of the access node, where a TEID in a tunneling protocol header in the error indication message is an invalid TEID; and sending the error indication message to a first user plane network element based on the invalid TEID in the received error indication message, where the error indication message is used to instruct the first user plane network element to send an error notification message to a control plane network element.

For specific implementations of the sixth aspect, refer to behavior functions of the forwarding node in the error indication processing method provided in the first aspect or the possible implementations of the first aspect. Details are not described herein again. Therefore, the forwarding node provided in the sixth aspect can achieve same beneficial effects as the first aspect.

According to a seventh aspect, an embodiment of the present disclosure provides a user plane network element, and the user plane network element may include:

a receiving unit, configured to receive an error indication message that is sent by a forwarding node and that includes a TEID of an access node and an IP address of the access node, where a TEID in a tunneling protocol header in the error indication message is an invalid TEID; and a sending unit, configured to send an error notification message to a control plane network element based on the error indication message, where the error notification message carries the TEID of the access node and the IP address of the access node, or carries a context identifier corresponding to the TEID of the access node and the IP address of the access node.

For specific implementations of the seventh aspect, refer to behavior functions of the user plane network element in the error indication processing method provided in the second aspect or the possible implementations of the second aspect. Details are not described herein again. Therefore, the user plane network element provided in the seventh aspect can achieve same beneficial effects as the second aspect.

According to an eighth aspect, an embodiment of the present disclosure provides a user plane network element, and the user plane network element may include:

a transceiver, configured to: receive an error indication message that is sent by a forwarding node and that includes a TEID of an access node and an IP address of the access node, where a TEID in a tunneling protocol header in the error indication message is an invalid TEID; and send an error notification message to a control plane network element based on the error indication message, where the error notification message carries the TEID of the access node and the IP address of the access node, or carries a context identifier corresponding to the TEID of the access node and the IP address of the access node.

For specific implementations of the eighth aspect, refer to behavior functions of the user plane network element in the error indication processing method provided in the second aspect or the possible implementations of the second aspect. Details are not described herein again. Therefore, the user plane network element provided in the eighth aspect can achieve same beneficial effects as the second aspect. In addition, the apparatus may further include a memory. The memory is configured to be coupled to a processor, and the memory stores a program instruction and data that are necessary for the apparatus.

According to a ninth aspect, an embodiment of the present disclosure provides a nonvolatile computer-readable storage medium that stores one or more programs, and the one or more programs include an instruction. When being executed by the user plane network element in any one of the seventh aspect or the possible implementations of the seventh aspect or in any one of the eighth aspect or the possible implementations of the eighth aspect, the instruction enables the user plane network element to perform the following events:

receiving an error indication message that is sent by a forwarding node and that includes a TEID of an access node and an IP address of the access node, where a TEID in a tunneling protocol header in the error indication message is an invalid TEID; and sending, to a control plane network element based on the received error indication message, an error notification message that carries the TEID of the access node and the IP address of the access node, or carries a context identifier corresponding to the TEID of the access node and the IP address of the access node.

For specific implementations of the ninth aspect, refer to behavior functions of the user plane network element in the error indication processing method provided in the second aspect or the possible implementations of the second aspect. Details are not described herein again. Therefore, the user plane network element provided in the ninth aspect can achieve same beneficial effects as the second aspect.

According to a tenth aspect, an embodiment of the present disclosure provides a control plane network element, and the control plane network element may include:

a receiving unit, configured to receive an error notification message that is sent by a first user plane network element and that carries a tunnel endpoint identifier TEID of an access node and an Internet Protocol IP address of the access node, or a context identifier; and a processing unit, configured to: process, according to a preset processing policy, a context corresponding to the TEID of the access node and the IP address of the access node, or process, according to a preset processing policy, a context corresponding to the context identifier.

For specific implementations of the tenth aspect, refer to behavior functions of the control plane network element in the error indication processing method provided in the third aspect or the possible implementations of the third aspect. Details are not described herein again. Therefore, the control plane network element provided in the tenth aspect can achieve same beneficial effects as the third aspect.

According to an eleventh aspect, an embodiment of the present disclosure provides a control plane network element, and the control plane network element may include:

a transceiver, configured to receive an error notification message that is sent by a first user plane network element and that carries a tunnel endpoint identifier TEID of an access node and an Internet Protocol IP address of the access node, or a context identifier; and a processor, configured to: process, according to a preset processing policy, a context corresponding to the TEID of the access node and the IP address of the access node, or process, according to a preset processing policy, a context corresponding to the context identifier.

For specific implementations of the eleventh aspect, refer to behavior functions of the control plane network element in the error indication processing method provided in the third aspect or the possible implementations of the third aspect. Details are not described herein again. Therefore, the control plane network element provided in the eleventh aspect can achieve same beneficial effects as the third aspect. In addition, the apparatus may further include a memory.

The memory is configured to be coupled to the processor, and the memory stores a program instruction and data that are necessary for the apparatus.

According to a twelfth aspect, an embodiment of the present disclosure provides a nonvolatile computer-readable storage medium that stores one or more programs, and the one or more programs include an instruction. When being executed by the control plane network element in any one of the eighth aspect or the possible implementations of the eighth aspect or in any one of the ninth aspect or the possible implementations of the ninth aspect, the instruction enables the control plane network element to perform the following events:

receiving an error notification message that is sent by a first user plane network element and that carries a tunnel endpoint identifier TEID of an access node and an Internet Protocol IP address of the access node, or a context identifier; and processing, according to a preset processing policy, a context corresponding to the TEID of the access node and the IP address of the access node, or processing, according to a preset processing policy, a context corresponding to the context identifier.

For specific implementations of the twelfth aspect, refer to behavior functions of the control plane network element in the error indication processing method provided in the third aspect or the possible implementations of the third aspect. Details are not described herein again. Therefore, the control plane network element provided in the twelfth aspect can achieve same beneficial effects as the third aspect.

According to a thirteenth aspect, an embodiment of the present disclosure provides an error indication processing system, including the forwarding node in any one of the fourth aspect or the implementations of the fourth aspect, in any one of the fifth aspect or the implementations of the fifth aspect, or in any one of the sixth aspect or the implementations of the sixth aspect, the user plane network element in any one of the seventh aspect or the implementations of the seventh aspect, in any one of the eighth aspect or the implementations of the eighth aspect, or in any one of the ninth aspect or the implementations of the ninth aspect, and the control plane network element in any one of the tenth aspect or the implementations of the tenth aspect, in any one of the eleventh aspect or the implementations of the eleventh aspect, or in any one of the twelfth aspect or the implementations of the twelfth aspect.

With reference to the thirteenth aspect, in a possible implementation of the thirteenth aspect, the error indication processing system may further include user equipment, an access node, and a packet data network, to implement the foregoing error indication processing method.

The error indication processing system provided in the thirteenth aspect may implement the error indication processing method described above, and therefore can achieve same beneficial effects as the foregoing error indication processing method.

DESCRIPTION OF EMBODIMENTS

A principle of the present disclosure is as follows: After receiving an error indication message, a forwarding node selects any user plane network element from a network, and forwards, to the user plane network element, the error indication message that includes a TEID of an access node and an IP address of the access node; and the user plane network element forwards the error indication message to a control plane network element, so that the control plane network element finds a corresponding context based on the TEID of the access node and the IP address of the access node, and implements a consistency between contexts of the access node and the user plane network element according to the found context and a preset processing policy (for example, re-establishing a context in the access node or deleting a context in the user plane network element), thereby ensuring normal transmission of a service data packet.

In descriptions of the present disclosure, it should be understood that a system or an element indicated by terms such as "first", "second", and "another" is a system or an element that is described based on the embodiments and that has a particular function, and is used for describing the present disclosure and for description simplicity, but does not indicate or imply that the indicated system or element needs to have the name, and therefore should not be construed as a limitation on the present disclosure.

Figure 1:
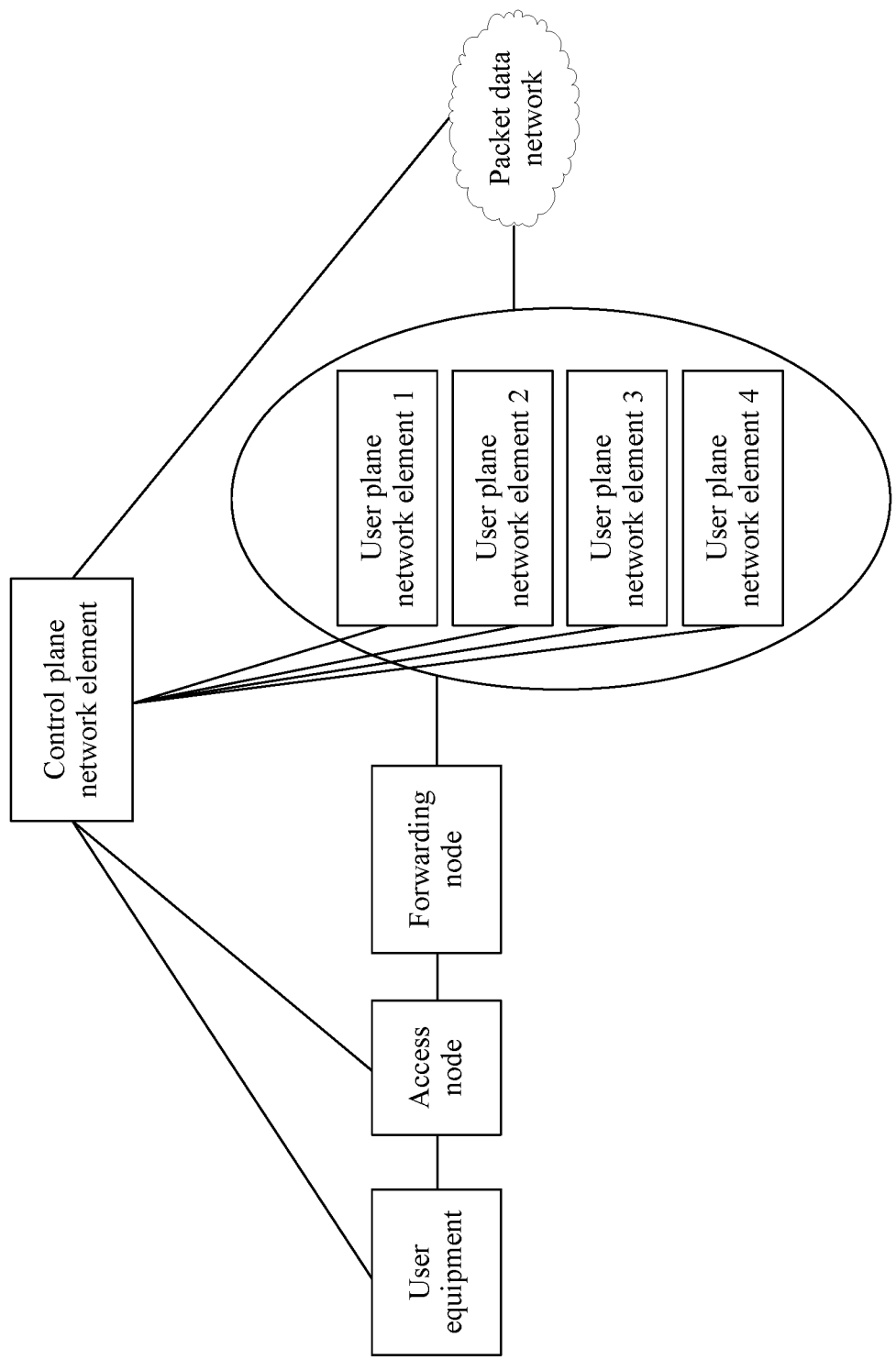
FIG. 1 is a schematic architectural diagram of a next generation mobile communications network.

An error indication processing method described in the present disclosure may be applied to a next generation mobile communications network (English: Next Generation Network, NGN) shown in FIG. 1. As shown in FIG. 1, the network may include an access node, a plurality of forwarding nodes between the access node and a user plane network element, a control plane network element, a plurality of user plane network elements, and a packet data network. It should be noted that FIG. 1 is a schematic diagram, and the node shown in FIG. 1 is merely an example. A quantity of nodes imposes no limitation on the solutions described in this application, and in particular, a quantity of forwarding nodes is not limited to a quantity of forwarding nodes shown in FIG. 1. In actual deployment, a plurality of forwarding nodes different from those shown in FIG. 1 may be deployed in the network. In addition, a name of the node or network element in FIG. 1 is used for describing the present disclosure and for description simplicity, but does not indicate or imply that the indicated node or network element needs to have the name, and therefore should not be construed as a limitation on the present disclosure.

The access node in FIG. 1 is located in an access network. The access network may be an enhanced Long Term Evolution (English: evolved Long Term Evolution, eLTE) network, or may be a 3rd Generation Partnership Project (English: 3rd Generation Partnership Project, 3GPP) access network in a next generation network access network (English: NextGen RAN), or may be a wireless local area network (English: Wireless Local Area Network, WLAN) or a fixed access network, or the like. The forwarding node between the access node and the user plane (English: User Plane, UP) network element is mainly responsible for forwarding a service data packet between the access node and the user plane network element, and the forwarding node may be a routing device such as a switch or a load balancing node. The user plane network element is mainly responsible for forwarding a user service data packet between the access node and the packet data network. The control plane (English: Control Plane, CP, or Core Control Function, CCF) network element is mainly responsible for connection management, security authentication, mobility management, location management, and the like of user equipment. It should be noted that module division may be further performed on the control plane network element in the next generation mobile communications network. A function module obtained through division may be considered as an independent network element. For example, the CP or CCF is divided into a session management (English: Session Management, SM) function module, an access and mobility management (English: Access and Mobility Management, AMM) function module, a user plane network element management (English: User Plane Management, UPM) function module, and the like. The session management function module is responsible for functions such as session establishment, updating, and deleting of the user equipment. The access and mobility management function module is responsible for access control and mobility management of the user equipment. The user plane network element management function module is responsible for a function such as topology management of the user plane network element. In a logical architecture in which the module division is performed on the control plane network element, a function of the control plane network element in the embodiments is performed by the session management function module, or performed by the user plane network element management function module and the session management function module through cooperation.

In addition, in FIG. 1, deployment of the forwarding nodes is an example, and is a feasible deployment solution in the embodiments of the present disclosure. There may be different deployment manners during actual implementation. Specifically, each forwarding node may be deployed in a transmission network independently of another network element in the network, for example, may be a switch; or may be deployed in a core network independently of another network element in the network, for example, may be a load balancing node. Alternatively, the plurality of forwarding nodes may be integrated into an existing node in the network to implement a function of the forwarding node. For example, the forwarding nodes between the user plane network element and the access node may be integrated into the access node, and the access node performs the function of the forwarding node. This is not limited in the embodiments of the present disclosure.

Figure 2A:
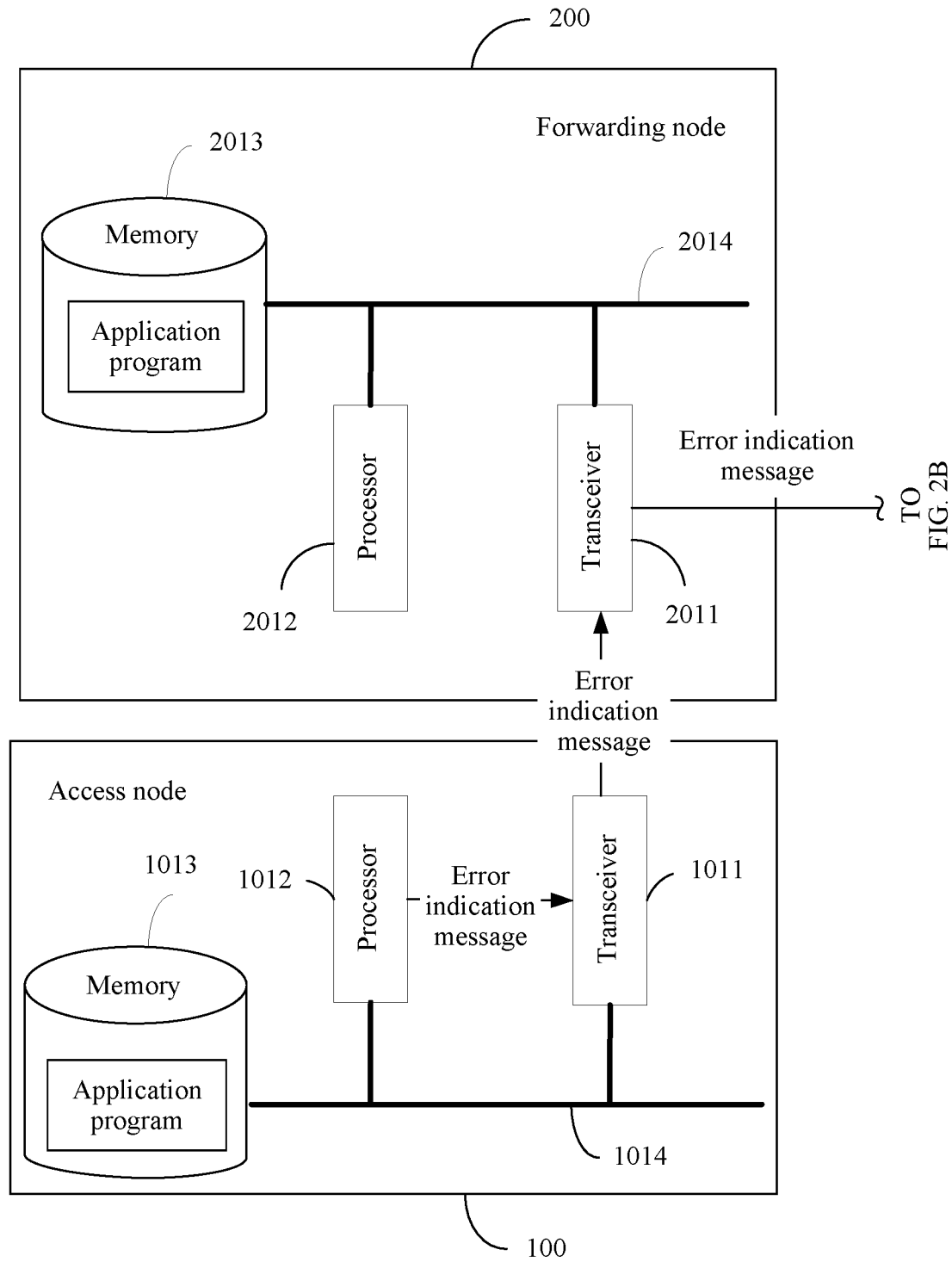
FIG. 2A and FIG. 2B are a schematic structural diagram of a network according to an embodiment of the present disclosure.
Figure 2B:
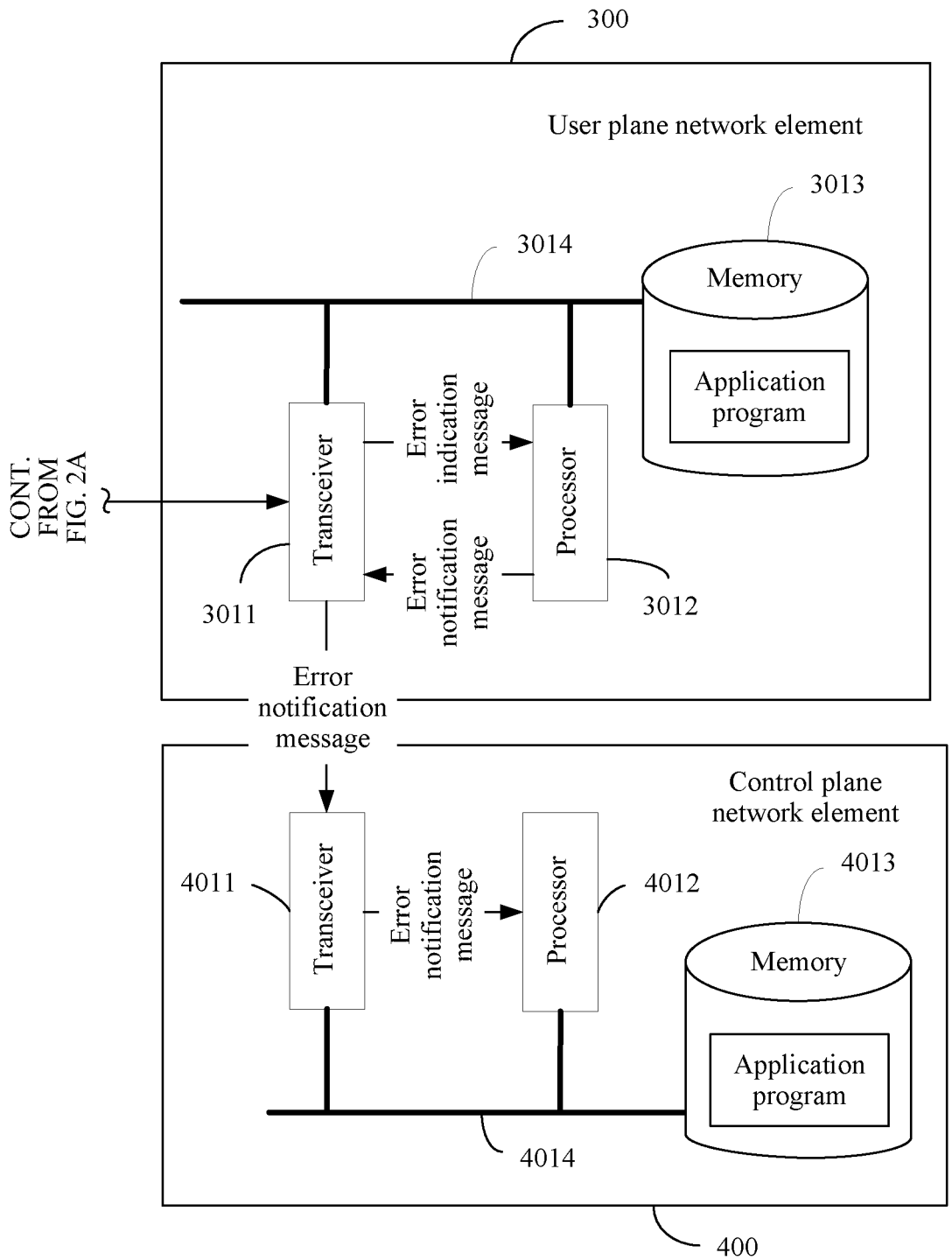

Main devices that execute a solution provided in an embodiment of the present disclosure are described below in detail with reference to FIG. 2A and FIG. 2B. As shown in FIG. 2A, an access node 100 in FIG. 1 may include a transceiver 1011, a processor 1012, a memory 1013, and at least one communications bus 1014. The communications bus 1014 is configured to implement connections and mutual communication between these apparatuses. A forwarding node 200 may include a transceiver 2011, a processor 2012, a memory 2013, and at least one communications bus 2014. The communications bus 2014 is configured to implement connections and mutual communication between these apparatuses. A user plane network element 300 may include a transceiver 3011, a processor 3012, a memory 3013, and at least one communications bus 3014. The communications bus 3014 is configured to implement connections and mutual communication between these apparatuses. A control plane network element 400 may include a transceiver 4011, a processor 4012, a memory 4013, and at least one communications bus 4014. The communications bus 4014 is configured to implement connections and mutual communication between these apparatuses.

The transceiver 1011 is a transceiver unit in the access node 100, may be an antenna unit, and is mainly configured to exchange data with an external network element. For example, the transceiver 1011 in the access node 100 may send an uplink service data packet or an error indication message to the forwarding node 200, or receive a downlink service data packet forwarded by the forwarding node 200.

The transceiver 2011 is a transceiver unit in the forwarding node 200, may be an antenna array, and is mainly configured to exchange data with an external network element. For example, the transceiver 2011 may receive an uplink service data packet or an error indication message sent by the transceiver 1011 in the access node 100, or forward a received error indication message to the user plane network element 300.

The transceiver 3011 is a transceiver unit in the user plane network element 300, may be an antenna array, and is mainly configured to exchange data with an external network element. For example, the transceiver 3011 may receive a downlink service data packet delivered by a packet data network, or receive an error indication message sent by the transceiver 2011 in the forwarding node 200, or forward a received downlink service data packet to the forwarding node 200.

The transceiver 4011 is a transceiver unit in the control plane network element 400, may be an antenna array, and is mainly configured to exchange data with an external network element. For example, the transceiver 4011 may receive an error indication message or an error notification message reported by the user plane network element, or deliver a control message to the access node 100.

The processor 1012, the processor 2012, the processor 3012, and the processor 4012 each may be a central processing unit (English: Central Processing Unit, CPU), or an application-specific integrated circuit (English: Application-Specific Integrated Circuit, ASIC), or one or more integrated circuits configured to implement this embodiment of the present disclosure, for example, one or more microprocessors (English: Digital Signal Processor, DSP) or one or more field programmable gate arrays (English: Field Programmable Gate Array, FPGA).

The memory 1013, the memory 2013, the memory 3013, and the memory 4013 each may be a volatile memory (English: volatile memory) such as a random access memory (English: Random Access Memory, RAM), or may be a nonvolatile memory (English: nonvolatile memory) such as a read-only memory (English: Read-Only Memory, ROM), a flash memory (English: flash memory), or a hard disk (English: Hard Disk Drive, HDD), or may be a solid state drive (English: Solid State Drive, SSD), or a combination of the foregoing types of memories. The memory 1013, the memory 2013, the memory 3013, and the memory 4013 may be configured to store data and code, so that the processor 1012 implements various functions of the access node 100 by running or executing the program code stored in the memory 1013 and invoking the data stored in the memory 1013, the processor 2012 implements various functions of the forwarding node 200 by running or executing the program code stored in the memory 2013 and invoking the data stored in the memory 2013, the processor 3012 implements various functions of the user plane network element 300 by running or executing the program code stored in the memory 3013 and invoking the data stored in the memory 3013, and the processor 4012 implements various functions of the control plane network element 400 by running or executing the program code stored in the memory 4013 and invoking the data stored in the memory 4013.

The communications bus 1014, the communications bus 2014, the communications bus 3014, and the communications bus 4014 each may be classified into an address bus, a data bus, a control bus, and the like, and each may be an industry standard architecture (English: Industry Standard Architecture, ISA) bus, a peripheral component interconnect (English: Peripheral Component, PCI) bus, an extended industry standard architecture (English: Extended Industry Standard Architecture, EISA) bus, or the like. For ease of representation, one bold line is used to represent each communications bus in FIG. 2A and FIG. 2B, but it does not mean that there is one bus or one type of bus.

In implementation of an error indication processing process provided in this embodiment of the present disclosure, when the processor 1012 does not find a context corresponding to a TEID of the access node and an IP address of the access node, the processor 1012 may generate an error indication message, and send the error indication message to the transceiver 2011 in the forwarding node 200 by using the transceiver 1011. The processor 2012 in the forwarding node 200 may randomly select a user plane network element 300 based on the error indication message, and send the error indication message to a transceiver 3011 in the user plane network element 300 by using the transceiver 2011 in the forwarding node 200. After receiving the error indication message, the transceiver 3011 in the user plane network element 300 may directly report the error indication message to the transceiver 4011 in the control plane network element 400. The processor 4012 in the control plane network element 400 queries, based on the TEID of the access node 100 and the IP address of the access node 100 that are in the error indication message, a context corresponding to the TEID of the access node and the IP address of the receiving node, and processes a context in the access node 100 or the user plane network element 300 according to the found context and a preset processing policy, to ensure a consistency between contexts of the access node 100 and the user plane network element 300. Alternatively, after the transceiver 3011 in the user plane network element 300 receives the error indication message, if a processor 3012 may find, based on the TEID of the access node and the IP address of the access node 100 that are in the error indication message, a context corresponding to the TEID of the access node and the IP address of the access node, the processor 3012 may report, by using the transceiver 3011, a context identifier corresponding to the found context to the transceiver 4011 in the control plane network element 400. The processor 4012 in the control plane network element 400 processes a context in the access node 100 or the user plane network element 300 according to the context corresponding to the context identifier and a preset processing policy, to ensure a consistency between contexts of the access node 100 and the user plane network element 300, thereby implementing normal transmission of a service data packet.

For ease of description, the error indication processing process provided in this embodiment of the present disclosure is shown and described in detail in a form of steps in the following embodiments. The shown steps may also be performed in a computer system that can execute a set of instructions. In addition, although a logical sequence is shown in the figure, in some cases, the shown or described steps may be performed in a sequence different from the sequence herein.

Figure 3A:
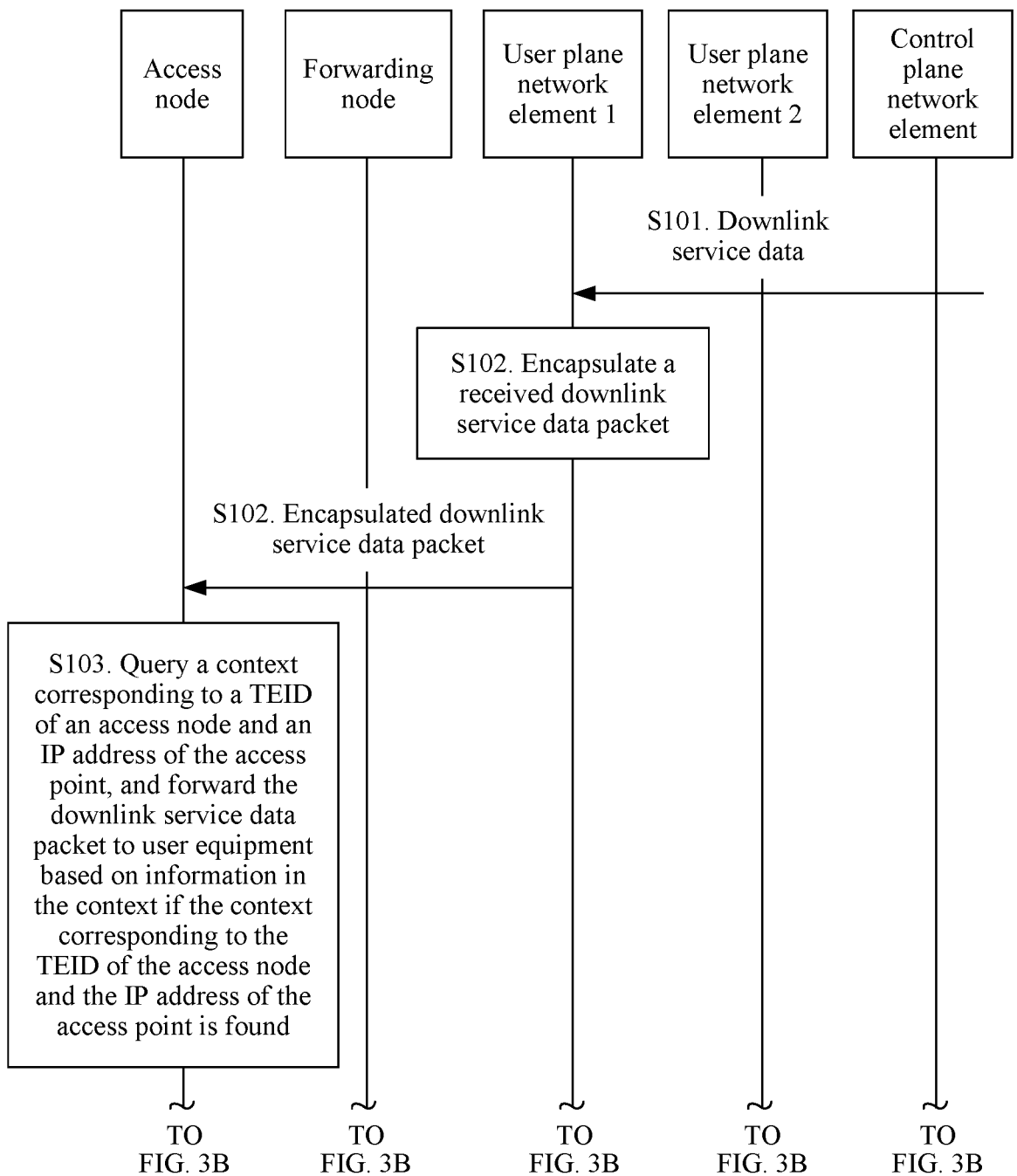
FIG. 3A and FIG. 3B are a flowchart of an error indication processing method according to an embodiment of the present disclosure.
Figure 3B:
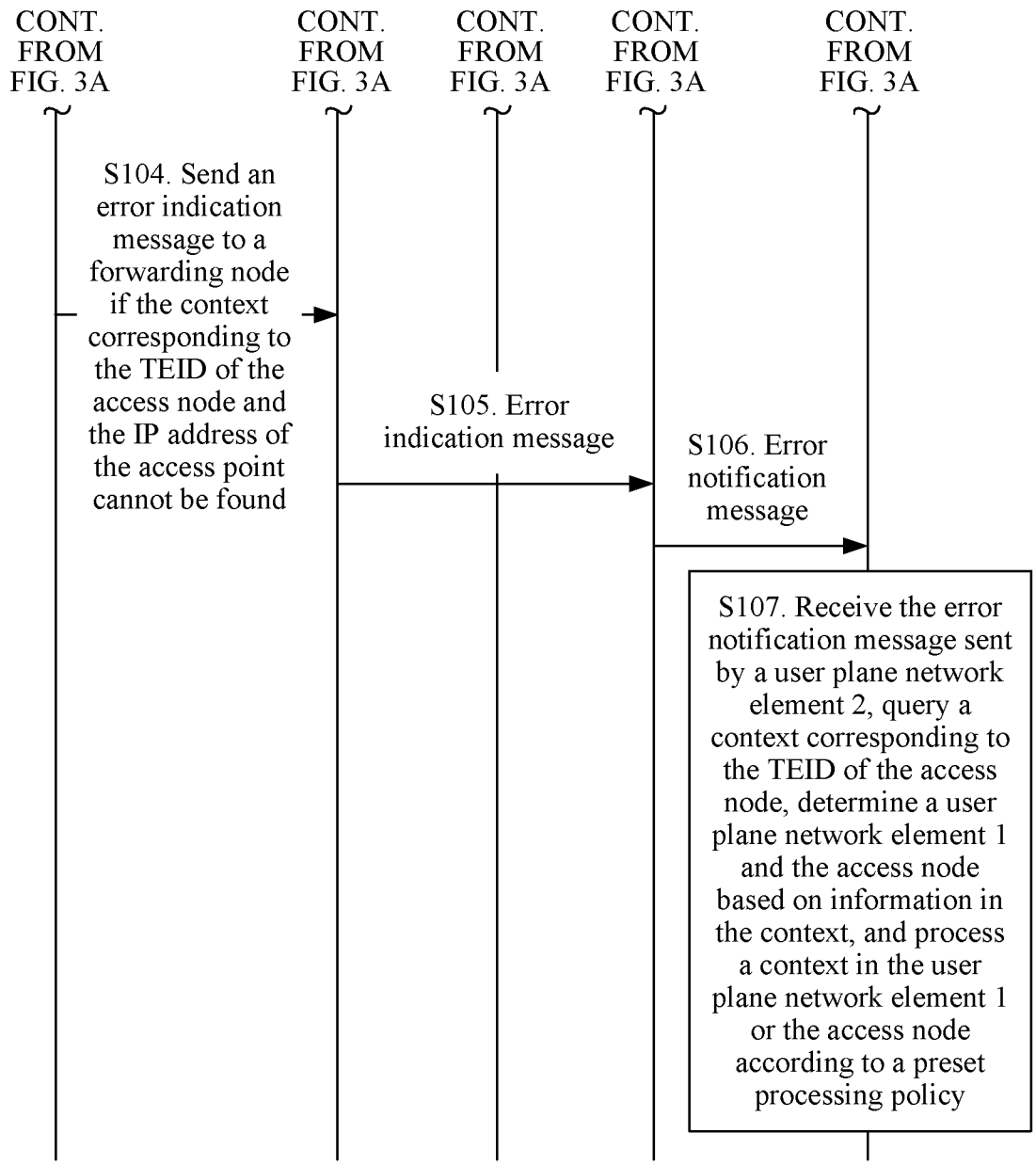

FIG. 3A and FIG. 3B are a flowchart of an error indication processing method according to an embodiment of the present disclosure. The method is interactively performed by devices in the network shown in FIG. 1 or FIG. 2A and FIG. 2B. As shown in FIG. 3A and FIG. 3B, the method may include the following steps.

Step S101: A user plane network element 1 receives a downlink service data packet sent to user equipment.

The downlink service data packet is sent from a packet data network to the user plane network element 1, an IP header of the downlink service data packet includes a destination IP address, the destination IP address is an IP address of the user equipment, and the IP address is used to identify the user equipment that receives the downlink service data packet.

It should be noted that in the next generation mobile communications network shown in FIG. 1, a link from a packet data network to a user plane network element, a forwarding node, an access node, and user equipment may be referred to as a downlink, and a service data packet sent on the link may be referred to as a downlink service data packet. A link from the user equipment to the access node, the forwarding node, the user plane network element, and then to the packet data network may be referred to as an uplink, and a service data packet sent on the link may be referred to as an uplink service data packet.

Step S102: The user plane network element 1 encapsulates the received downlink service data packet, and forwards an encapsulated downlink service data packet to an access node by using a forwarding node.

The encapsulated downlink service data packet may carry a TEID of the access node and an IP address of the access node.

Optionally, after receiving the downlink service data packet, the user plane network element 1 may encapsulate a tunneling protocol layer and an IP layer outside the downlink service data packet. For example, the user plane network element 1 may add, to an encapsulated tunneling protocol header, the TEID of the access node that is assigned by the access node to the user plane network element 1, and add, to an encapsulated IP header, the IP address of the access node that is used as the destination IP address; and send, by using the forwarding node to the access node, the downlink service data packet that carries the TEID of the access node and the IP address of the access node.

The IP address of the access node is used to identify the access node that receives the encapsulated downlink service data packet.

The TEID of the access node may be assigned by the access node to the user plane network element 1 by using a signaling message. The TEID of the access node is used to identify a tunnel from the access node to the user plane network element 1, and the tunnel may be used to transmit, between the access node and the user plane network element 1, a downlink service data packet related to user equipment.

It should be noted that in this embodiment of the present disclosure, a granularity of the tunnel may be based on user equipment (English: User Equipment, UE), may be based on a packet data network connection (English: Packet Data Network Connection, PDN Connection), or may be based on a session or a bearer. To be specific, a user equipment context, a packet data network connection context, a session context, or a bearer context in the access node may be matched by using the TEID.

TEIDs of the access node and the user plane network element 1 are assigned in a process such as user attachment, connection establishment, session establishment, or bearer establishment. The foregoing context is also established in the process such as user attachment, connection establishment, session establishment, or bearer establishment. The context may include information related to user equipment, a connection, a session, or a bearer, for example, information such as a user identifier, bearer quality of service (English: Quality of Service, QoS), a TEID assigned by a local network element, or an IP and a TEID of a peer network element. Only when a context in the access node can be matched by using the TEID of the access node, the access node considers that the downlink service data packet that carries the TEID is valid, in other words, the service data packet is a service data packet of user equipment that normally accesses the access node and establishes a service channel; and the access node forwards the downlink service data packet to the user equipment based on related information in the context.

For example, after being attached to the network, the user equipment may send, to a control plane network element, a connection establishment request used to establish a connection to the packet data network. After the control plane network element receives the connection establishment request, if the control plane network element determines that the user plane network element 1 forwards a service data packet between the user equipment and the packet data network, the control plane network element sends a TEID of the user plane network element 1 and an IP address of the user plane network element 1 to the access node, and sends, to the user plane network element 1, a TEID and an IP address related to the connection that are assigned by the access node. In addition, the control plane network element returns, to the user equipment, a connection establishment response message that includes an IP address assigned by the control plane network element to the user equipment. In this way, a connection channel between the user equipment and the packet data network is established by using the user plane network element 1. The control plane network element uses the IP address of the user equipment, the TEID of the access node, the IP address of the access node, the TEID of the user plane network element 1, the IP address of the user plane network element 1, and the like as a context for storage, and sends the context to the user plane network element 1. The access node uses the TEID of the user plane network element 1, the IP address of the user plane network element 1, the TEID of the access node, the IP address of the access node, and the like as a context for storage. It should be noted that in some cases, the IP address of the access node does not need to be stored in a context of the access node, and the IP address of the user plane network element 1 does not need to be stored in a context of the user plane network element 1. For example, the access node or the user plane network element 1 has only one IP address to communicate with another node. Other parameters such as quality of service (QoS) are exchanged in a connection establishment process, are also stored in the context, and are not enumerated herein.

Step S103: The access node receives the encapsulated downlink service data packet sent by the user plane network element 1, queries a context corresponding to a TEID of the access node and an IP address of the access point, and forwards the downlink service data packet to the user equipment based on information in the context if the access node finds the context corresponding to the TEID of the access node and the IP address of the access node, or performs step S104 if the access node cannot find the context corresponding to the TEID of the access node and the IP address of the access node.

Optionally, the access node may use the TEID of the access node and the IP address of the access node as a keyword to match a context record stored in the access node. When there is a first context, and a TEID of the access node and an IP address of the access node that are stored in the first context are respectively consistent with the TEID of the access node and the IP address of the access node that are in the encapsulated downlink service data packet, the first context is the context corresponding to the TEID of the access node and the IP address of the access node.

Alternatively, the access node uses only the TEID of the access node as a keyword to match a context record stored in the access node. When there is a first context, and a TEID of the access node that is stored in the first context is consistent with the TEID of the access node that is in the encapsulated downlink service data packet, the first context is the context corresponding to the TEID of the access node and the IP address of the access node.

Step S104: The access node sends an error indication message to the forwarding node, where the error indication message includes the TEID of the access node and the IP address of the access node that are carried in the downlink service data packet encapsulated in step S102, and a TEID field in a tunneling protocol header of the error indication message is an invalid field, namely, an invalid TEID.

The IP address of the access node and the TEID of the access node in step S104 may be carried in different information elements of the error indication message or a same information element of the error indication message.

Optionally, the tunnel endpoint identifier in the tunneling protocol header in the error indication message may be set to all zero, to identify the invalid TEID.

Step S105: After receiving the error indication message that is sent by the access node and in which the TEID field in the tunneling protocol header is the invalid field, the forwarding node selects any user plane network element such as a user plane network element 2 from a network in which the forwarding node is located, and sends the error indication message to the user plane network element 2.

Optionally, the forwarding node may select, by using a preset algorithm, any user plane network element from the network in which the forwarding node is located, for example, may randomly select a user plane network element by using a random algorithm; or may select a fixed user plane network element, for example, fixedly select the user plane network element 2, to be specific, the forwarding node forwards each received error indication message to the user plane network element 2; or may check a locally stored correspondence between a TEID of a user plane network element and the user plane network element to determine a user plane network element in a first correspondence as a finally selected user plane network element.

Step S106: The user plane network element 2 receives the error indication message, and sends an error notification message to a control plane network element.

Optionally, the user plane network element may directly forward the received error indication message to the control plane network element, where the error indication message is the error notification message. The directly forwarding the received error indication message to the control plane network element may include: adding the error indication message to the error notification message, and sending the error notification message to the control plane network element. It may be understood that in this case, the error notification message may include the error indication message. For example, the user plane network element 2 may extract information such as the TEID of the access node and the IP address of the access node from the error indication message, add the information to the error notification message, and notify the control plane network element of the information by using the error notification message. Alternatively, the error notification message may include a message other than the error indication message. For example, the user plane network element 2 may extract, from the error indication message, all information such as a tunneling protocol message type, the TEID of the access node, and the IP address of the access node that are in the error indication message, add the information to the error notification message, and notify the control plane network element of the information by using the error notification message. The tunneling protocol message type is used to indicate that the user plane network element 2 receives the error indication message. This is not limited in this embodiment of the present disclosure.

Alternatively, after receiving the error indication message, the user plane network element 2 queries, by using the TEID of the access node and the IP address of the access node that are carried in the error indication message, a context corresponding to the TEID of the access node and the IP address of the access node; and forwards the error indication message to the control plane network element only if the user plane network element 2 does not find the context corresponding to the TEID of the access node and the IP address of the access node, where the error indication message is the error notification message.

Step S107: The control plane network element receives the error notification message sent by the user plane network element 2, queries a context corresponding to the TEID of the access node and the IP address of the access node, determines the user plane network element 1 and the access node based on information in the context, and processes a context in the user plane network element 1 or the access node according to a preset processing policy.

A manner in which the control plane network element queries the context is the same as a manner in which the access node queries the context in step S103. Details are not described herein again.

The preset processing policy may be locally configured by the control plane network element, or may be delivered by using another network element such as an operation and maintenance (English: Operation and Maintenance, O&M) network element. Specifically, the control plane network element may process the context in the user plane network element or the access node according to the following two processing policies:

Manner 1: Restore the context.

The control plane network element instructs the access node to re-establish the context corresponding to the TEID of the access node and the IP address of the receiving node, and obtains information such as a TEID reassigned by the access node. The control plane network element sends, to the user plane network element 1, the received information such as the TEID reassigned by the access node, and instructs the user plane network element 1 to update the context.

Manner 2: Delete the context.

The control plane network element instructs the user plane network element 1 to delete the context corresponding to the TEID of the access node and the IP address of the access node. In addition, the control plane network element deletes the locally stored context corresponding to the TEID of the access node and the IP address of the access node.

It should be noted that in this embodiment of the present disclosure, if the control plane network element is divided into a session management function module, an access and mobility management function module, a user plane network element management function module, and the like, a function performed by the control plane network element is performed by the session management module.

Alternatively, the session management module manages the context corresponding to the IP address of the access node and the TEID of the access node. The user plane network element management module records a correspondence between the session management module that manages the context and the IP address of the access node and the TEID of the access node. The user plane network element sends the error notification message to the user plane network element management module, and the user plane network element management module forwards the error notification message to a corresponding session management function module based on the IP address of the access node, the TEID of the access node, and the correspondence stored in the user plane network element management module.

Compared with the prior art, in the technical solution shown in FIG. 3A and FIG. 3B, the forwarding node forwards the received error indication message to any user plane network element, and then the user plane network element sends the error notification message to the control plane network element, so that the control plane network element finds, based on the TEID of the access node and the IP address of the access node that are in the error notification message, the context corresponding to the TEID of the access node and the IP address of the access node, and processes the context in the access node or the user plane network element based on information about the access node and the user plane network element in the context. In this way, a consistency between the contexts of the access node and the user plane network element is ensured, thereby avoiding a problem that user experience is affected due to a data packet transmission failure caused because the access node cannot find the context in the received downlink data packet that includes the TEID of the access node.

In another feasible solution of the present disclosure, alternatively, the forwarding node may exactly select a user plane network element (for example, a user plane network element that sends a downlink service data packet to the access node, namely, the user plane network element 1) that can find a context corresponding to the TEID of the access node and the IP address of the access node. The user plane network element 1 finds, based on information carried in the error indication message, the context corresponding to the TEID of the access node and the IP address of the access node, and sends a context identifier corresponding to the context to the control plane network element. The control plane network element directly determines a context based on the received context identifier, and processes a context in the access node or the user plane network element based on information in the context, to ensure a consistency between contexts of the access node and the user plane network element. Specific implementation is shown in FIG. 4A and FIG. 4B.

Figure 4A:
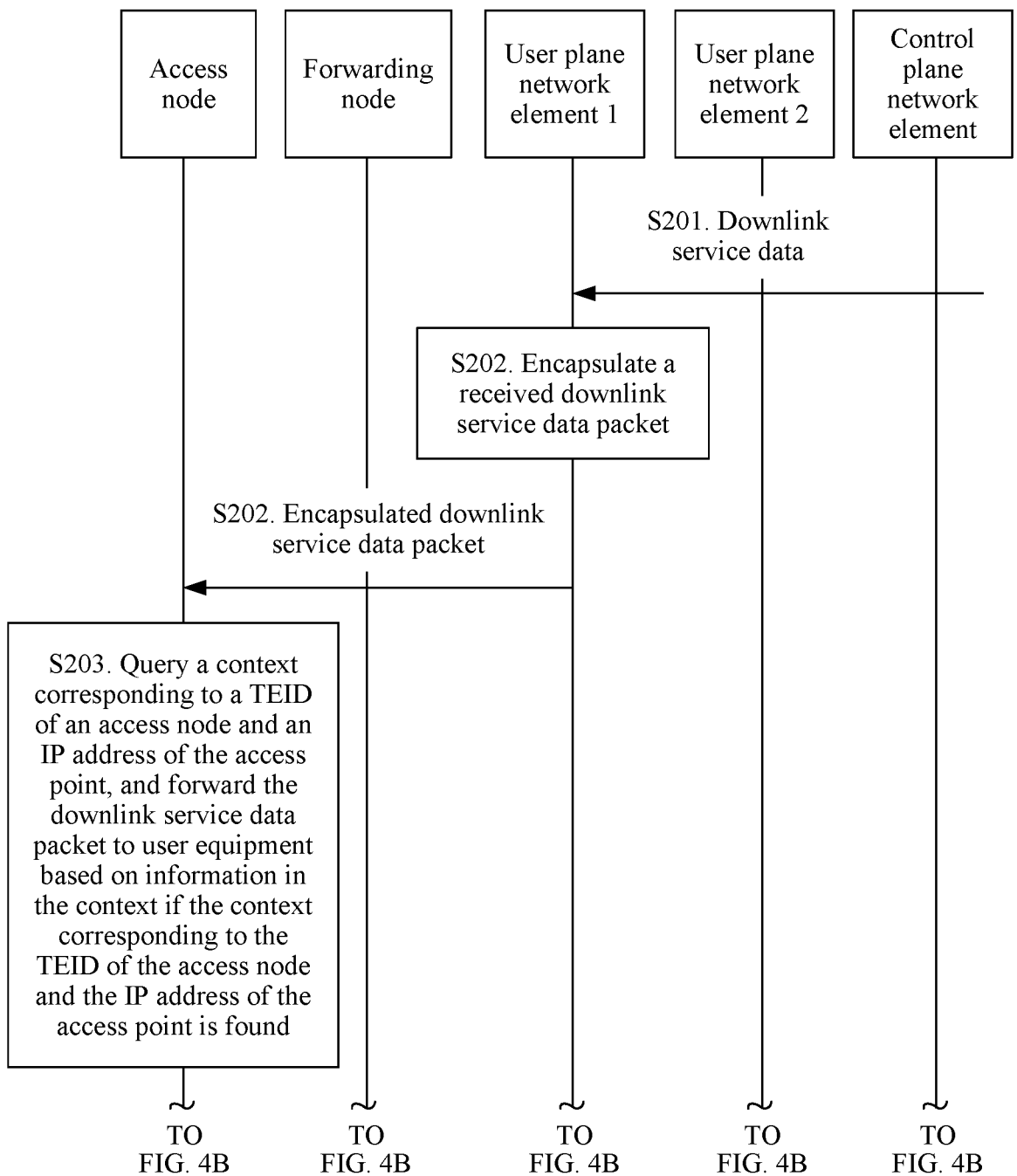
FIG. 4A and FIG. 4B are a flowchart of another error indication processing method according to an embodiment of the present disclosure.
Figure 4B:
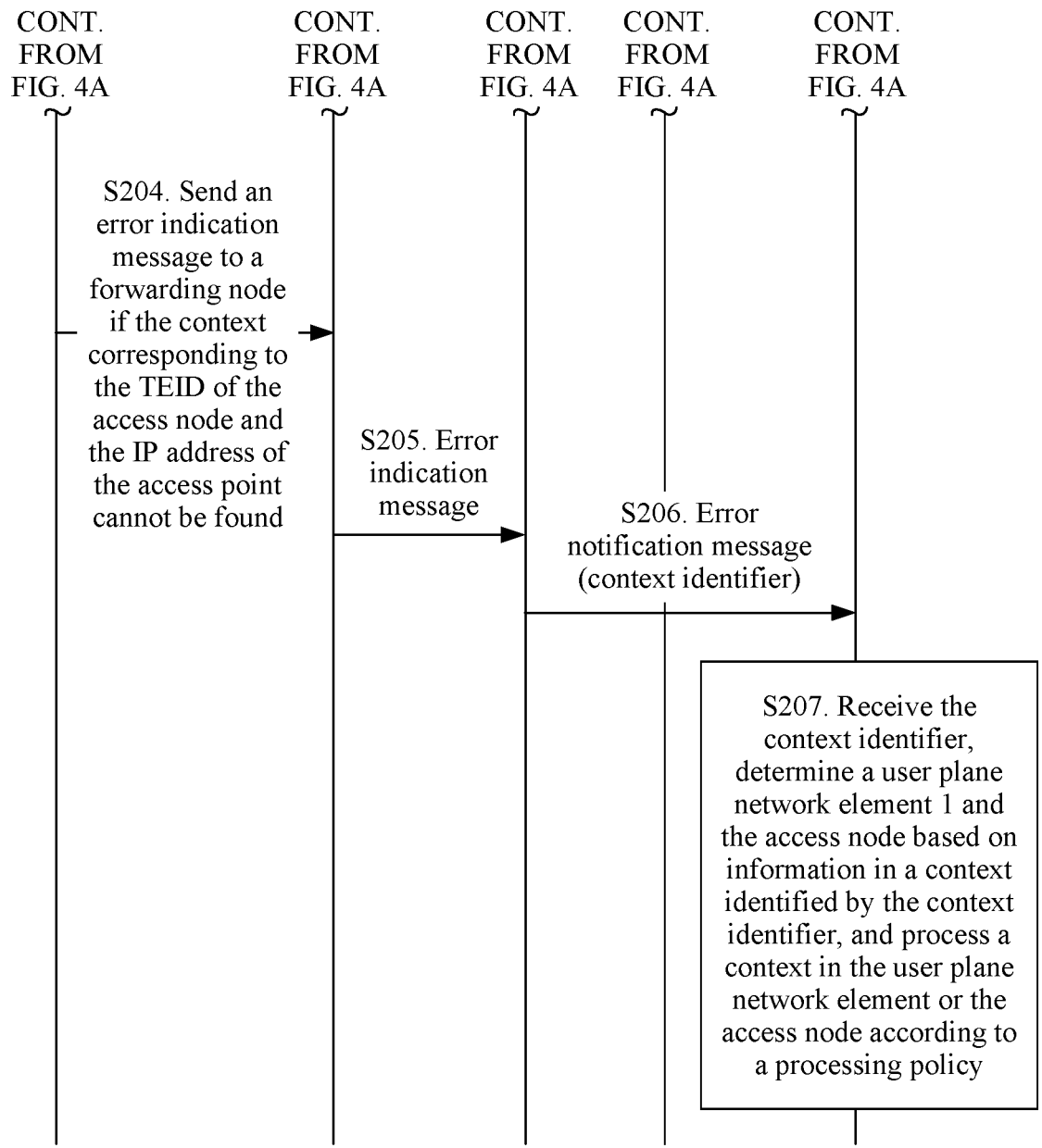

FIG. 4A and FIG. 4B are a flowchart of another error indication processing method according to an embodiment of the present disclosure. The method is interactively performed by devices in the next generation network shown in FIG. 1. As shown in FIG. 4A and FIG. 4B, the method may include the following steps.

Step S201 to step S204 are performed. Step S201 is the same as step S101, step S202 is the same as step S102, step S203 is the same as step S103, and step S204 is the same as step S104. Details are not described herein again.

Step S205: After receiving the error indication message that is sent by the access node and in which the TEID field in the tunneling protocol header is the invalid TEID, the forwarding node sends the error indication message to the user plane network element 1.

Step S206: The user plane network element 1 receives the error indication message, finds, based on the TEID of the access node and the IP address of the access node that are carried in the error indication message, a context corresponding to the TEID of the access node and the IP address of the access node, obtains a context identifier of the context, and sends, to a control plane network element, an error notification message that carries the context identifier.

Step S207: The control plane network element receives the context identifier, determines the user plane network element 1 and the access node based on information in the context identified by the context identifier, and processes a context in the user plane network element or the access node according to a processing policy.

The control plane network element may process the context in the user plane network element or the access node by using the processing policy shown in step S107. Details are not described herein again.

In this embodiment, if the control plane network element is divided into a session management function module, an access and mobility management function module, a user plane network element management function module, and the like, a function performed by the control plane network element may be performed by the session management function module.

Alternatively, the session management module manages the context corresponding to the IP address of the access node and the TEID of the access node. The user plane network element management module records a correspondence between the context identifier and the session management module that manages the context. The user plane network element sends the error notification message to the user plane network element management module, and the user plane network element management module forwards the error notification message to a corresponding session management function module based on the context identifier in the error notification message and the correspondence stored in the user plane network element management module.

In this way, in the technical solution shown in FIG. 4A and FIG. 4B, the forwarding node forwards the received error indication message to any user plane network element, and then the user plane network element generates, based on the error indication message, the error notification message that includes the context identifier, and sends the error notification message to the control plane network element, so that the control plane network element determines the corresponding context based on the context identifier in the error notification message, and processes the context in the access node or the user plane network element based on information about the access node and the user plane network element in the context. In this way, a consistency between the contexts of the access node and the user plane network element is ensured, thereby avoiding a problem that user experience is affected due to a data packet transmission failure caused because the access node cannot find the context in the received downlink data packet that includes the TEID of the access node.

The error indication processing method provided in the embodiments of the present disclosure is mainly described above from the perspective of interaction between the access node, the forwarding node, the user plane network element, and the control plane network element. It may be understood that to implement the foregoing functions, the foregoing node or network element includes a corresponding hardware structure and/or software module for implementing each function. Persons skilled in the art should easily be aware that, units and algorithm steps in examples described with reference to the embodiments disclosed in this specification can be implemented by hardware or a combination of hardware and computer software in the present disclosure. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present disclosure.

Figure 5:
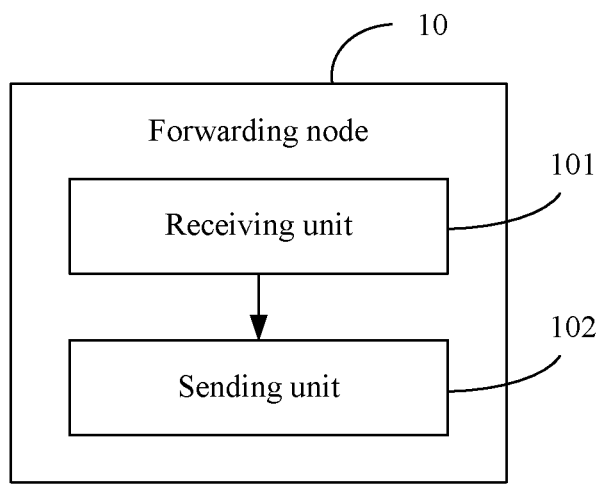
FIG. 5 is a structural diagram of a forwarding node according to an embodiment of the present disclosure.
Figure 6:
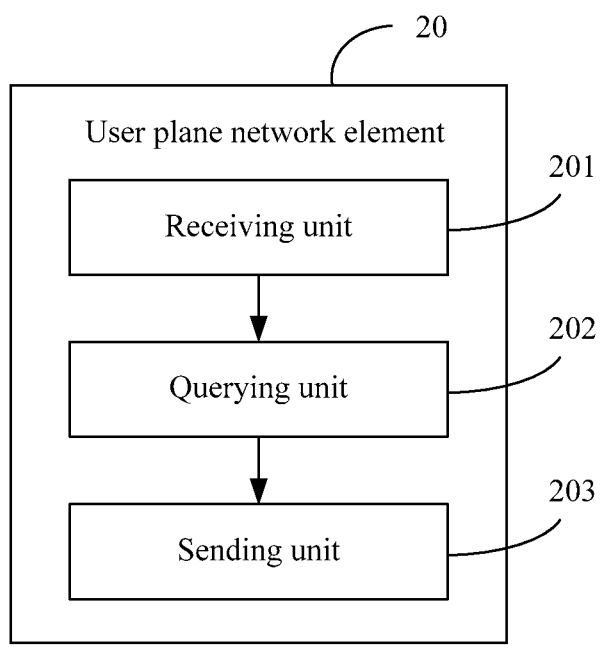
FIG. 6 is a structural diagram of a user plane network element according to an embodiment of the present disclosure.
Figure 7:
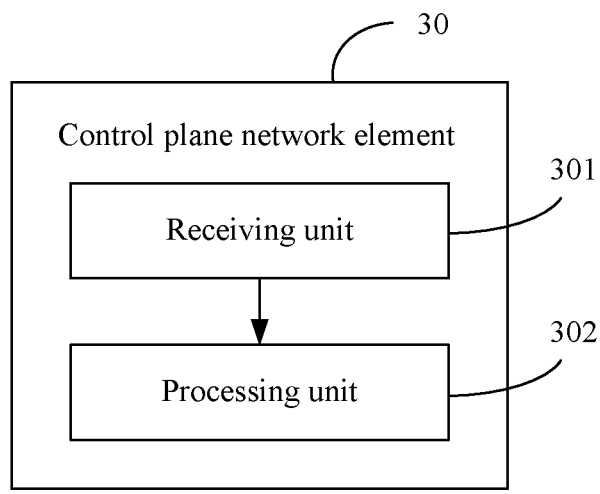
FIG. 7 is a structural diagram of a control plane network element according to an embodiment of the present disclosure.

In the embodiments of the present disclosure, function module division may be separately performed on the forwarding node, the user plane network element, and the control plane network element based on the foregoing method examples with reference to FIG. 5 to FIG. 7. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present disclosure is an example, and is logical function division. There may be another division manner during actual implementation.

When each function module is obtained through division based on each corresponding function, FIG. 5 is a possible schematic structural diagram of a forwarding node 10 according to an embodiment of the present disclosure. As shown in FIG. 5, the forwarding node 10 may be configured to implement the method performed by the forwarding node in the foregoing method embodiment, and the forwarding node 10 may include a receiving unit 101 and a sending unit 102. The receiving unit 101 is configured to support the forwarding node in performing process S104 in FIG. 3B and process S204 in FIG. 4B. The sending unit 102 is configured to support the forwarding node in performing process S105 in FIG. 3B and process S106 in FIG. 4B.

When an integrated unit is used, the receiving unit 101 and the sending unit 102 shown in FIG. 5 may be integrated into the transceiver 2011 in the forwarding node 200 shown in FIG. 2A, so that the transceiver 2011 performs functions of the receiving unit 101 and the sending unit 102. Further, the forwarding node 10 may further include a processing module and a storage module. The storage module is configured to store program code and data of the forwarding node 10. The processing module is configured to execute the program code and the data in the storage module to implement a corresponding function of the forwarding node in the foregoing method embodiment. The processing module may be the processor 2012 in an entity structure of the forwarding node 200 shown in FIG. 2A, and may be a processor or a controller, for example, may be a CPU, a general purpose processor, a DSP, an ASIC, an FPGA or another programmable logic device, a transistor logic device, a hardware component, or any combination thereof. The processing module may implement or execute various example logical blocks, modules, and circuits described with reference to content disclosed in the present disclosure.

When each function module is obtained through division based on each corresponding function, FIG. 6 is a possible schematic structural diagram of a user plane network element 20 according to an embodiment of the present disclosure. As shown in FIG. 6, the user plane network element 20 may be configured to implement the method performed by the user plane network element in the foregoing method embodiment, and the user plane network element 20 may include a receiving unit 201, a querying unit 202, and a sending unit 203. The receiving unit 201 is configured to support the user plane network element 20 in performing steps S101 and S105 in FIG. 3A and FIG. 3B and steps S201 and S205 in FIG. 4A and FIG. 4B. The querying unit is configured to support the user plane network element 20 in performing a function of generating an error notification message. The sending unit 203 is configured to support the user plane network element 20 in performing steps S102 and S106 in the procedure shown in FIG. 3A and FIG. 3B and steps S202 and S206 in the procedure shown in FIG. 4A and FIG. 4B.

When an integrated unit is used, the receiving unit 201 and the sending unit 203 shown in FIG. 6 may be integrated into a communications module, configured to support the user plane network element 20 in communicating with another network entity. The querying unit 202 shown in FIG. 6 may be integrated into a processing module, configured to support the user plane network element 20 in performing a function of generating an error notification message. The communications module may be the transceiver 3011 in the user plane network element 300 shown in FIG. 2B, and the processing module may be the processor 3012 in the user plane network element 300 shown in FIG. 2B.

When each function module is obtained through division based on each corresponding function, FIG. 7 is a possible schematic structural diagram of a control plane network element 30 according to an embodiment of the present disclosure. As shown in FIG. 7, the control plane network element 30 may be configured to implement the method performed by the control plane network element in the foregoing method embodiment, and the control plane network element 30 may include a receiving unit 301 and a processing unit 302. The receiving unit is configured to support the control plane network element 30 in performing step S106 shown in FIG. 3B and step S206 shown in FIG. 4B. The processing unit 302 is configured to support the control plane network element 30 in performing step S107 shown in FIG. 3B and step S207 shown in FIG. 4B.

When an integrated unit is used, the receiving unit 301 shown in FIG. 7 may be integrated into a communications module, configured to support the control plane network element 30 in communicating with another network entity. The processing unit 302 shown in FIG. 7 may be integrated into a processing module, configured to support the control plane network element 30 in performing an action performed by the processing unit 302. In addition, the control plane network element 30 may further include a storage module, configured to store program code and data of the control plane network element 30. The communications module may be the transceiver 4011 in the control plane network element 400 shown in FIG. 2B, the processing module may be the processor 4012 in the control plane network element 400 shown in FIG. 2B, and the storage module may be the memory 4013 in the control plane network element 400 shown in FIG. 2B.

It should be noted that all related content of the steps in the foregoing method embodiments may be cited in function descriptions of the corresponding function modules, and details are not described herein again.

Figure 8:
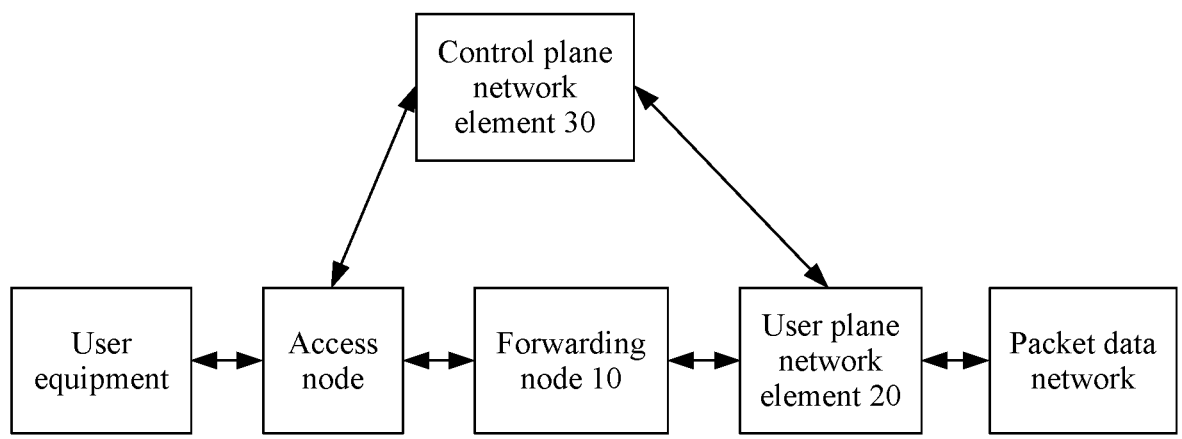
FIG. 8 is a structural diagram of an error indication processing system according to an embodiment of the present disclosure.

In addition, an embodiment of the present disclosure further provides an error indication processing system. As shown in FIG. 8, the error indication processing system may include a forwarding node 10, a user plane network element 20, and a control plane network element 30.

The forwarding node 10, the user plane network element 20, and the control plane network element 30 are the same as the foregoing devices, and details are not described herein.

The error indication processing system shown in FIG. 8 may further include user equipment, an access node, and a packet data network, to implement the foregoing error indication processing methods shown in FIG. 3A and FIG. 3B and FIG. 4A and FIG. 4B.

In addition, the error indication processing system provided in this embodiment of the present disclosure implements the foregoing error indication processing methods shown in FIG. 3A and FIG. 3B and FIG. 4A and FIG. 4B, and therefore can achieve same beneficial effects as the foregoing service transmission method. Details are not described herein again.

It may be clearly understood by persons skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the apparatus embodiment described above is an example. For example, the unit division is logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, function units in the embodiments of the present disclosure may be integrated into one processing unit, or each of the function units may exist alone, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, a network device, or the like) to perform some of the steps of the methods described in the embodiments of the present disclosure. The foregoing storage medium includes any medium that can store program code, such as a Universal Serial Bus (English: Universal Serial Bus, USB) flash drive (English: USB flash drive), a removable hard disk, a read-only memory (English: read-only memory, ROM), a random access memory (English: random access memory, RAM), a magnetic disk, or an optical disc.

Finally, it should be noted that the foregoing embodiments are intended for describing the technical solutions of the present disclosure, but not for limiting the present disclosure. Although the present disclosure is described in detail with reference to the foregoing embodiments, persons of ordinary skill in the art should understand that they may still make modifications to the technical solutions recorded in the foregoing embodiments or make equivalent replacements to some technical features thereof, without departing from the scope of the claims.

What is claimed is:

1. An error indication processing method, wherein the method comprises:
   receiving, by a forwarding node, an error indication message sent by an access node, wherein the error indication message comprises a tunnel endpoint identifier (TEID) of the access node and an Internet Protocol (IP) address of the access node, and wherein the TEID in a tunneling protocol header in the error indication message is an invalid TEID; and
   sending, by the forwarding node, the error indication message to a first user plane network element based on the invalid TEID, wherein the error indication message is used to instruct the first user plane network element to send an error notification message to a control plane network element, wherein the error indication message is a message sent by the access node to the forwarding node after the access node receives a service data packet sent by a second user plane network element, but does not find a context corresponding to the TEID of the access node and the IP address of the access node; and the service data packet comprises the TEID of the access node and the IP address of the access node.

2. A forwarding node, wherein the forwarding node comprises:
   a transceiver configured to:
      receive an error indication message sent by an access node, wherein the error indication message comprises a tunnel endpoint identifier (TEID) of the access node and an Internet Protocol (IP) address of the access node, and the TEID in a tunneling protocol header in the error indication message is an invalid TEID; and
      send the error indication message to a first user plane network element based on the invalid TEID in the error indication message received by the transceiver, wherein the error indication message is used to instruct the first user plane network element to send an error notification message to a control plane network element, wherein the error indication message is a message sent by the access node to the forwarding node after the access node receives a service data packet sent by a second user plane network element, but does not find a context corresponding to the TEID of the access node and the IP address of the access node; and the service data packet comprises the TEID of the access node and the IP address of the access node.

3. The forwarding node according to claim 2, wherein the forwarding node further comprises:
   at least one processor; and
   a non-transitory computer-readable storage medium coupled to the at least one processor and storing programming instructions for execution by the at least one processor, wherein the programming instructions instruct the at least one processor to:
      select, by using a preset algorithm, the first user plane network element from a network in which the forwarding node is located; and
      cause to the transceiver to send the error indication message to the first user plane network element selected by the processor.

4. The forwarding node according to claim 3, wherein the programming instructions instruct the at least one processor to:
   before selecting, by using the preset algorithm, the first user plane network element from the network in which the forwarding node is located, learn that the TEID in the tunneling protocol header in the error indication message is the invalid TEID.

5. A user plane network element, wherein the user plane network element comprises:
   a transceiver configured to:
      receive an error indication message sent by a forwarding node, wherein the error indication message comprises a tunnel endpoint identifier (TEID) of an access node and an Internet Protocol (IP) address of the access node, and the TEID in a tunneling protocol header in the error indication message is an invalid TEID, wherein the error indication message is a message sent by the access node to the forwarding node after the access node receives a service data packet sent by a second user plane network element, but does not find a context corresponding to the TEID of the access node and the IP address of the access node; and the service data packet comprises the TEID of the access node and the IP address of the access node; and
      send an error notification message to a control plane network element based on the error indication message, wherein the error notification message carries the TEID of the access node and the IP address of the access node, or carries a context identifier corresponding to the TEID of the access node and the IP address of the access node.

6. The user plane network element according to claim 5, wherein the user plane network element further comprises:
   at least one processor; and
   a non-transitory computer-readable storage medium coupled to the at least one processor and storing programming instructions for execution by the at least one processor, wherein the programming instructions instruct the at least one processor to:
      query, based on the TEID of the access node and the IP address of the access node that are in the error indication message received by the transceiver, the context corresponding to the TEID of the access node and the IP address of the access node; and cause the transceiver to: if the processor finds the context corresponding to the TEID of the access node and the IP address of the access node, send, to the control plane network element, the error notification message that comprises the context identifier.

7. A control plane network element, wherein the control plane network element comprises:

a transceiver configured to receive an error notification message sent by a first user plane network element, wherein the error notification message carries a tunnel endpoint identifier (TEID) of an access node and an Internet Protocol (IP) address of the access node, wherein the error notification message is in response to that the first user plane network element receives an error indication message from a forwarding node after the access node receives a service data packet, but does not find a context corresponding to the TEID of the access node and the IP address of the access node, and the service data packet comprises the TEID of the access node and the IP address of the access node; and at least one processor; and a non-transitory computer-readable storage medium coupled to the at least one processor and storing programming instructions for execution by the at least one processor, wherein the programming instructions instruct the at least one processor to:

query, based on the TEID of the access node and the IP address of the access node, the context corresponding to the TEID of the access node and the IP address of the access node; and determine the access node and a second user plane network element based on information comprised in the context; and re-establish a context that is in the access node and that corresponds to the TEID of the access node and the IP address of the access node, or delete a context that is in the second user plane network element and that corresponds to the TEID of the access node and the IP address of the access node.

8. A control plane network element, wherein the control plane network element comprises:

a transceiver configured to receive an error notification message sent by a first user plane network element, wherein the error notification message carries a context identifier, wherein the error notification message is in response to that the first user plane network element receives an error indication message from a forwarding node after an access node receives a service data packet, but does not find a context corresponding to a tunnel endpoint identifier (TEID) of the access node and an Internet Protocol (IP) address of the access node, and the service data packet comprises the TEID of the access node and the IP address of the access node; and at least one processor; and a non-transitory computer-readable storage medium coupled to the at least one processor and storing programming instructions for execution by the at least one processor, wherein the programming instructions instruct the at least one processor to:

query, based on the context identifier, a context corresponding to the context identifier;

determine the access node and a second user plane network element based on information comprised in the context; and re-establish a context that is in the access node and that corresponds to the TEID of the access node and the address of the access node, or delete a context that is in the second user plane network element and that corresponds to the TEID of the access node and the IP address of the access node.

9. An error indication processing system, comprising:

a forwarding node;

a first user plane network element; and a control plane network element, wherein:

the forwarding node is configured to:

receive an error indication message from an access node, wherein the error indication message comprises a tunnel endpoint identifier (TEID) of the access node and an Internet Protocol (IP) address of the access node, and the TEID in a tunneling protocol header in the error indication message is an invalid TEID, and send the error indication message to the first user plane network element based on the invalid TEID in the error indication message, wherein the error indication message is a message sent by the access node to the forwarding node after the access node receives a service data packet, but does not find a context corresponding to the TEID of the access node and the IP address of the access node; and the service data packet comprises the TEID of the access node and the IP address of the access node;

the first user plane network element is configured to:

receive the error indication message from the forwarding node; and send an error notification message to the control plane network element based on the error indication message, wherein the error notification message carries the TEID of the access node and the IP address of the access node, or carries a context identifier corresponding to the TEID of the access node and the IP address of the access node; and the control plane network element is configured to:

receive the error notification message sent by the first user plane network element; and process, according to a first preset processing policy, the context corresponding to the TEID of the access node and the IP address of the access node, or process, according to a second preset processing policy, a context corresponding to the context identifier.

10. The system according to claim 9, wherein the control plane network element is configured to:

in response to that the error notification message carries the TEID of the access node and the IP address of the access node, query based on the TED of the access node and the IP address of the access node, the context corresponding to the TEID of the access node and the IP address of the access node;

determine the access node and a second user plane network element based on information comprised in the context; and re-establish a context that is in the access node and that corresponds to the TEID of the access node and the IP address of the access node, or delete a context that is in the second user plane network element and that corresponds to the TEID of the access node and the IP address of the access node.

11. The system according to claim 9, wherein the control plane network element is configured to:
in response to that the error notification message carries the context identifier,
query based on the context identifier, the context corresponding to the context identifier;
determine the access node and a second user plane network element based on information comprised in the context; and
re-establish a context that is in the access node and that corresponds to the TEID of the access node and the IP address of the access node, or delete a context that is in the second user plane network element and that corresponds to the TEID of the access node and the IP address of the access node.

12. The system according to claim 9, wherein the forwarding node is configured to:
select, by using a preset algorithm, the first user plane network element from a network in which the forwarding node is located; and
send the error indication message to the first user plane network element.

13. The system according to claim 9, wherein the forwarding node is further configured to:
before selecting, by using a preset algorithm, the first user plane network element from a network in which the forwarding node is located,
learn that the TEID in the tunneling protocol header in the error indication message is the invalid TEID.

14. The system according to claim 9, wherein the first user plane network element is further configured to:
query based on the TEID of the access node and the IP address of the access node, the context corresponding to the TEID of the access node and the IP address of the access node; and
if the first user plane network element finds the context corresponding to the TEID of the access node and the IP address of the access node, send to the control plane network element, the context identifier corresponding to the TEID of the access node and the IP address of the access node.

15. An error indication processing method, wherein the method comprises:
receiving, by a forwarding node, an error indication message sent by an access node, wherein the error indication message comprises a tunnel endpoint identifier (TEID) of the access node and an Internet Protocol (IP) address of the access node, and wherein the TEID in a tunneling protocol header in the error indication message is an invalid TEID; and
sending, by the forwarding node, the error indication message to a first user plane network element based on the invalid TEID, wherein the error indication message is used to instruct the first user plane network element to send an error notification message to a control plane network element, wherein the error indication message is a message sent by the access node to the forwarding node after the access node receives a service data packet, but does not find a context corresponding to the TEID of the access node and the IP address of the access node; and the service data packet comprises the TEID of the access node and the IP address of the access node;
receiving, by the first user plane network element, the error indication message; and sending, by the first user plane network element, the error notification message to the control plane network element based on the error indication message, wherein the error notification message carries the TEID of the access node and the IP address of the access node, or carries a context identifier corresponding to the TED of the access node and the IP address of the access node;
receiving, by the control plane network element, the error notification message sent by the first user plane network element; and
processing, by the control plane network element, according to a first preset processing policy, the context corresponding to the TEID of the access node and the IP address of the access node, or processing, by the control plane network element, according to a second preset processing policy, a context corresponding to the context identifier.

16. The method according to claim 15, wherein in response to that the error notification message carries the TED of the access node and the IP address of the access node, the processing, by the control plane network element, according to the first preset processing policy, the context corresponding to the TEID of the access node and the IP address of the access node comprises:
querying, by the control plane network element based on the TEID of the access node and the IP address of the access node, the context corresponding to the TEID of the access node and the IP address of the access node;
determining, by the control plane network element, the access node and a second user plane network element based on information comprised in the context; and
re-establishing a context that is in the access node and that corresponds to the TEID of the access node and the IP address of the access node, or deleting a context that is in the second user plane network element and that corresponds to the TEID of the access node and the IP address of the access node.

17. The method according to claim 15, wherein in response to that the error notification message carries the context identifier, the processing, by the control plane network element, according to the second preset processing policy, the context corresponding to the context identifier comprises:
querying, by the control plane network element based on the context identifier, the context corresponding to the context identifier;
determining, by the control plane network element, the access node and a second user plane network element based on information comprised in the context; and
re-establishing a context that is in the access node and that corresponds to the TEID of the access node and the IP address of the access node, or deleting a context that is in the second user plane network element and that corresponds to the TEID of the access node and the IP address of the access node.

18. The method according to claim 15, wherein the sending, by the forwarding node, the error indication message to the first user plane network element based on the invalid TED comprises:
selecting, by the forwarding node by using a preset algorithm, the first user plane network element from a network in which the forwarding node is located; and
sending, by the forwarding node, the error indication message to the first user plane network element.

19. The method according to claim 15, before selecting, by the forwarding node by using a preset algorithm, the first user plane network element from a network in which the forwarding node is located, further comprising:

learning, by the forwarding node, that the TED in the tunneling protocol header in the error indication message is the invalid TEID.

20. The method according to claim 15, wherein the method further comprises:

querying, by the first user plane network element based on the TED of the access node and the IP address of the access node, the context corresponding to the TEID of the access node and the IP address of the access node; and if the first user plane network element finds the context corresponding to the TED of the access node and the IP address of the access node, sending, by the first user plane network element to the control plane network element, the context identifier corresponding to the TEID of the access node and the IP address of the access node.

\* \* \* \* \*